US012265512B2

(12) United States Patent
Pot et al.

(10) Patent No.: US 12,265,512 B2
(45) Date of Patent: Apr. 1, 2025

(54) DATA MANAGEMENT SYSTEM

(71) Applicant: HONEYWELL INTERNATIONAL INC., Charlotte, NC (US)

(72) Inventors: Martin Pot, Seville Grove (AU); Andrew Griffiths, Calgary (CA)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 50 days.

(21) Appl. No.: 18/212,214

(22) Filed: Jun. 21, 2023

(65) Prior Publication Data

US 2024/0427744 A1 Dec. 26, 2024

(51) Int. Cl.
*G06F 16/215* (2019.01)
*G06F 9/54* (2006.01)
*G06F 16/23* (2019.01)

(52) U.S. Cl.
CPC ............ *G06F 16/215* (2019.01); *G06F 9/547* (2013.01); *G06F 16/2358* (2019.01)

(58) Field of Classification Search
CPC ..... G06F 9/547; G06F 16/215; G06F 16/2358
USPC ....................................................... 707/692
See application file for complete search history.

(56) References Cited

U.S. PATENT DOCUMENTS

| | | | |
|---|---|---|---|
| 9,674,562 B1* | 6/2017 | Spracklen | H04N 21/233 |
| 10,230,496 B2* | 3/2019 | Kim | H04L 1/1614 |
| 2005/0201400 A1* | 9/2005 | Park | H04L 47/624 |
| | | | 370/412 |
| 2010/0260204 A1* | 10/2010 | Pepper | H04L 43/106 |
| | | | 370/474 |
| 2011/0211593 A1* | 9/2011 | Pepper | H04L 43/028 |
| | | | 370/474 |
| 2014/0157307 A1* | 6/2014 | Cox | H04N 21/47214 |
| | | | 725/34 |
| 2017/0351227 A1* | 12/2017 | Paul | E21B 43/2406 |
| 2019/0182627 A1* | 6/2019 | Thoresen | H04L 63/045 |
| 2020/0379978 A1* | 12/2020 | Wright | G06F 16/2322 |
| 2020/0403928 A1* | 12/2020 | Amend | H04L 47/624 |
| 2022/0067099 A1* | 3/2022 | Raghavendra | G06F 16/24568 |

* cited by examiner

*Primary Examiner* — Cam Linh T Nguyen (57) ABSTRACT

Approaches for managing communication between a first database server and a second database server are described. According to one example, an out-of-sequence data (OOSD) notification is generated by the first database server each time out-of-sequence data is received from at least one data source. The OOSD notification indicates receipt of the out-of-sequence data from the at least one data source and may include the out-of-sequence data. The OOSD notification is then transmitted by the first database server to the second database server over a dedicated communication channel. The OOSD notification is received and processed by the second database server for incorporating the out-of-sequence data within a database of the second database server in a chronological order.

20 Claims, 8 Drawing Sheets

DATA MANAGEMENT SYSTEM

BACKGROUND

Sites, such as power stations, refineries, mine sites, educational institutions, hospitals, etc., utilize data management systems to collect, manage, protect, and store data related to the sites. The data management systems generally include a plurality of database servers for storing the data. The database servers may be located at same or different geographical locations and may serve multiple purposes. For instance, a first set of database servers may directly interact with assets operating in the sites to collect the data related to the sites while a second set of databases may interact with the first set of database servers to collect and store for further processing, the data obtained by the first set of database servers. The data may be accessed by the plurality of database servers for various purposes, such as to make business decisions, production decisions, decisions to improve currently used strategy, or other logistical decisions related to the sites.

BRIEF DESCRIPTION OF FIGURES

Systems and/or methods are now described, in accordance with examples of the present subject matter and with reference to the accompanying figures, in which.

DETAILED DESCRIPTION

With advancement in technology, data generated in working environments in most of the industries and enterprises is stored and/or processed electronically. For instance, sites, such as power stations, refineries, mine sites, educational institutions, hospitals, etc., may store data, such as sensor readings, user information, laboratory test results, etc. The stored data may be processed for various purposes, such as to make business decisions, production decisions, decisions to improve currently used strategy, or other logistical decisions related to the sites. For example, in a power station, temperature readings of a thermostat may be stored periodically in a database. The stored, real-time and/or historical, temperature readings may be processed to determine variations in the temperature and decide if any equipment in the power station is faulty. With the increase in dependency on electronically stored and processed data, data management systems to collect, manage, protect, and store data related to the sites have gained utmost importance.

The data management systems generally include a plurality of database servers for storing the data. One database server may communicate with another database server to transfer data to the other database server or to access data stored in the other database server. For example, a data management system may include one or more source database servers and a destination database server, where data from the source database servers may be periodically transferred to the destination database server. The source database servers may be located at the site and maybe used to collect the data from at least one data source, such as a thermostat, a power meter, etc. The source database servers may tag the data with a tag that identifies the data source from which the data originated and may store data originating from the same data source at the same location. Further, the source database servers may store the collected data in a chronological order according to a timestamp associated with the collected data.

The destination database server may be located either at the site or at a central location and may be used to collect data from the source database servers and store the collected data. In an example, the data stored at the destination database server may be analyzed and used to make business decisions, production decisions, or other logistical decisions.

In conventional data management systems, source database servers transmit the stored data at a regular interval based on the timestamp associated with the data. The conventional data management systems thus transfer all the real-time data from the source database servers to the destination database server based on the timestamp associated with the real-time data.

However, transferring data based on the timestamp associated with the data, may result in data loss as out-of-sequence data may generally be missed out and not transmitted to the destination database server. The out-of-sequence data may be defined as the data that is received by the source database servers out-of-sequence, i.e., after the time at which the data was actually generated. For example, if the data is received later, say 30 minutes or 1 hour after the time at which the data is generated by the data source, the data may be labelled as out-of-sequence data. In such a case, the source database server may have already received and stored data generated later but received earlier than the out-of-sequence data. Examples of the out-of-sequence data include data that is manually edited by a user, data that is manually input by a user, data associated with test results of a laboratory, and data associated with calculations which are re-calculated historically.

One conventional technique, for storing the out-of-sequence data at the destination database server, involves the destination database server periodically querying data for specific tags from the source database servers. The destination database server processes the data received for the specific tags and compares the received data with the data stored at the destination database server for the specific tags to find out if any data in the received data is missing in the data stored at the destination database server.

However, fetching and analyzing all the historical data for a particular tag rather than just the out-of-sequence data is a brute force approach that is very inefficient. A lot of processing resources are consumed and wasted while analyzing the real-time data along with the out-of-sequence data, especially when dealing with a large set of data. Further, custom components, such as additional software modules, need to be deployed and used to fetch and analyze all the historical data. Furthermore, in order to transfer all the historical data for a particular tag, which may be huge, additional firewall holes are usually required, thereby compromising the security of the data stored in the source database servers.

Approaches for managing communication between a source database server and a destination database server are described. The described approach processes out-of-sequence data to allow automatic and timely transmission of the out-of-sequence data from the source database server to the destination database server without expending processing resources for processing real-time data.

According to an example of the present subject matter, in a data management system including a source database server and a destination database server, an out-of-sequence data (OOSD) notification is generated by the source database server each time out-of-sequence data is received from at least one data source. The OOSD notification indicates receipt of the out-of-sequence data from the at least one data source and may include the out-of-sequence data. The OOSD notification is then transmitted by the source database server to the destination database server over a dedicated communication channel. The OOSD notification is received and processed by the destination database server for incorporating the out-of-sequence data within a database of the destination database server in a chronological order.

Although, the out-of-sequence data is explained to be transmitted from one source database server to one destination database server, in an example, one or more source database servers may be configurable to transmit the out-of-sequence data to the destination database server in the same manner as described.

In an example, the destination database server may also act as the source database server for transmitting the out-of-sequence data to a global database server. The global database server may be configurable to receive the out-of-sequence data from one or more destination database servers. In this example, the functionalities performed by the source database server may be performed by the destination database server and the source database server and the at least one data source may collectively act as at the least one data source for the destination database server.

According to an example, the source database server may identify out-of-sequence data from amongst time-stamped data received from at least one data source. The out-of-sequence data has a timestamp of a time prior to a current time. The source database server may further generate an OOSD notification indicating receipt of the out-of-sequence data from the at least one data source. The OOSD notification may include the out-of-sequence data and a tag indicative of the at least one data source from which the out-of-sequence data originated. The source database server may subsequently transmit the OOSD notification to a destination database server over a dedicated communication channel.

In one example, the OOSD notification may be transmitted, by the source database server to the destination database server over a first communication channel. If the first communication channel is a dedicated communication channel, the destination database server may determine that the data notification is the OOSD notification and the data is the out-of-sequence data. The destination database server may then retrieve the out-of-sequence data from the OOSD notification and analyze the associated tag to determine the data source from which the out-of-sequence data originated. The destination database server may then incorporate the out-of-sequence data within pre-stored data associated with the tag, in a time-sequential manner based on the timestamp.

Generating and transmitting the OOSD notification to the destination database server each time the out-of-sequence data is received from at least one data source, facilitates in ensuring that the out-of-sequence data is transmitted, by exception, from a source database server to a destination database server. As a result, the out-of-sequence data is never missed and is automatically and timely transmitted to the destination database server without the destination database server implementing additional processing resources for querying and auditing a set of data which may include real-time data in addition to the out-of-sequence data. Thus, wastage of processing resources is avoided by avoiding consumption of processing resources for analyzing the real-time data.

Further, the out-of-sequence data is transmitted to the destination database server over a dedicated communication channel which is different from a data transfer channel over which the real-time data may be transmitted to the source database server. Utilization of a dedicated communication channel for transmitting or receiving the out-of-sequence data helps in avoiding the requirement of additional firewalls. Further, the destination database server may easily identify data received over the dedicated communication channel as the out-of-sequence data. The dedicated communication channel thus not only helps in securely transferring the out-of-sequence data but also facilitates quick identification of the received data as the out-of-sequence data without any analysis. The destination database server may then process the received out-of-sequence data in the described manner to incorporate the out-of-sequence data within the database in a time-sequential manner.

Further, the tag associated with the out-of-sequence data may enable the destination database server to separately arrange the data for separate tags in a time-sequential manner.

The present subject matter is further described with reference to FIG. 1 to FIG. 6. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Figure 1:
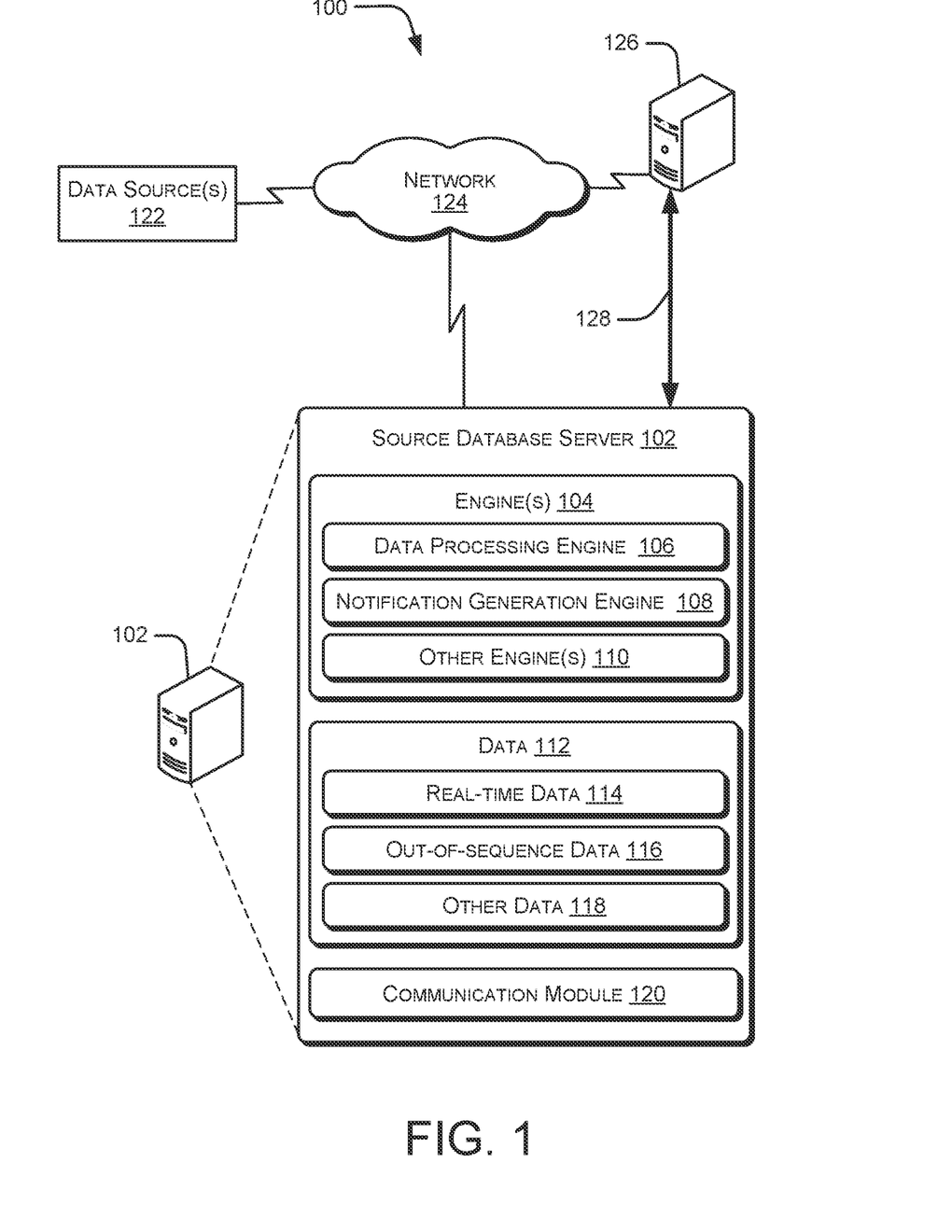
FIG. 1 illustrates a data management system, according to an example.

FIG. 1 illustrates a data management system 100, according to an example. The data management system 100 includes a source database server 102. In one example, the source database server 102 may be hosted virtually, for example, on a cloud-based platform at a site or away from the site. In another example, the source database server 102 may be a stand-alone physical system geographically located either on the site or away from the site. Examples of the site may include, but are not limited to, a power station, a refinery, a mine site, an educational institution, a hospital, or any other working environments in any industry or enterprise.

The source database server 102 may include engine(s) 104. The engine(s) 104 may be implemented as a combination of hardware and programming, for example, programmable instructions to implement a variety of functionalities of the engine(s) 104. In examples described herein, such combinations of hardware and programming may be implemented in several different ways. For example, the programming for the engine(s) 104 may be executable instructions.

Such instructions may be stored on a non-transitory machine-readable storage medium which may be coupled either directly with the source database server 102 or indirectly (for example, through networked means). In an example, the engine(s) 104 may include a processing resource, for example, either a single processor or a combination of multiple processors, to execute such instructions. In the present examples, the non-transitory machine-readable storage medium may store instructions that, when executed by the processing resource, implement engine(s) 104. In other examples, the engine(s) 104 may be implemented as electronic circuitry.

The engine(s) 104 includes a data processing engine 106, a notification generation engine 108, and other engine(s) 110. The other engine(s) 110 may further implement functionalities that supplement functions performed by the source database server 102 or any of the engine(s) 104.

The source database server 102 may further include data 112. The data 112 includes data that is either received, stored, or generated as a result of functions implemented by any of the engine(s) 104 or the source database server 102. It may be further noted that information stored and available in the data 112 may be utilized by the engine(s) 104 for performing various functions by the source database server 102. In an example, the data 112 may include real-time data 114, out-of-sequence data 116, and other data 118. It may be noted that such examples are only indicative. The present approaches may be applicable to other examples without deviating from the scope of the present subject matter. In an example, the real-time data 114 may be defined as data having a timestamp of the same time at which the data is received at the source database server 102. The out-of-sequence data 116 may be defined as data that has a timestamp of a time prior to the time at which the data is received at the source database server 102. The out-of-sequence data may thus be received out of sequence, as data generated after the out-of-sequence data may already have been received at the source database server 102 before the out-of-sequence data was received. Example(s) of the other data 118 has been described later.

The source database server 102 may further include a communication module 120. In one example, the communication module 120 may be a wireless communication module. Examples of the communication module 120 may include, but are not limited to, Global System for Mobile communication (GSM) modules, Code-division multiple access (CDMA) modules, Bluetooth modules, network interface cards (NIC), Wi-Fi modules, dial-up modules, Integrated Services Digital Network (ISDN) modules, Digital Subscriber Line (DSL) modules, and cable modules. In one example, the communication module 120 may also include one or more antennas to enable wireless transmission and reception of data and signals.

In operation, the data processing engine 106 of the source database server 102 identifies out-of-sequence data 116 from amongst time-stamped data received from at least one data source 122. The out-of-sequence data 116 has a timestamp of a time prior to a current time. The current time may be defined as the time of receiving the time-stamped data from the at least one data source 122. Examples of the at least one data source 122 may include, but are not limited to, a thermostat, a power meter, a multimeter, a potentiometer, an ammeter, a laptop, a portable user device, or any other electronic device. In an example, the at least one data source 122 such as a laptop, a portable user device, etc., may be accessible to a user for manually modifying data 112 or inputting data that can be transmitted to the source database server 102.

The out-of-sequence data 116 may be received from the at least one data source 122 based on one of an input from a user, test results of a laboratory, a data modification input from a user, and calculation results by a calculating unit coupled to the at least one data source. For example, data related to test results from a laboratory may be received at the source database server 102 sometime after the tests got concluded. The data related to the test results may thus be received at a time later than the time indicated in the timestamp associated with the data.

The source database server 102 may be communicably coupled with the at least one data source 122 over a network 124. The network 124 may be a wireless network, a wired network, or a combination thereof. The network 124 may also be an individual network or a collection of many such individual networks, interconnected with each other and functioning as a single large network, e.g., the Internet or an intranet. Examples of such individual networks include, but are not limited to, local area network (LAN), wide area network (WAN), the internet, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 124 may include various network entities, such as transceivers, gateways, and routers. In an example, the network 124 may include any communication network that uses any of the commonly used protocols, for example, Hypertext Transfer Protocol (HTTP), and Transmission Control Protocol/Internet Protocol (TCP/IP). The source database server 102 and the at least one data source 122 may thus be communicably coupled with each other over the network 124 and may exchange data and signals.

The data management system 100 may also include a destination database server 126. In one example, the destination database server 126 may be hosted virtually, for example, on a cloud-based platform at the site or away from the site. In another example, the destination database server 126 may be a stand-alone physical system geographically located either on the site or away from the site. In an example, the source database server 102 and the destination database server 126 may be geographically distributed at same or different locations. Further, the source database server 102 may be communicably coupled with the destination database server 126 over the network 124 and may exchange data and signals.

In operation, upon receiving the out-of-sequence data, the notification generation engine 108 of the source database server 102 generates an out-of-sequence data (OOSD) notification. The OOSD notification indicates receipt of the out-of-sequence data 116 from the at least one data source 122. The OOSD notification includes the out-of-sequence data 116. In one example, the communication module 120, hereinafter alternatively referred to as a first communication module 120, transmits the OOSD notification to the destination database server 126 over a dedicated communication channel 128. The dedicated communication channel 128 may be different from a data peering channel, hereinafter alternatively referred to as a data transfer channel, established over the network 124. The dedicated communication channel 128 may be utilized for communication related to the out-of-sequence data 116 between the source database server 102 and the destination database server 126. The data peering channel may be utilized for other communication, including communication related to the real-time data 114 between the source database server 102 and the destination database server 126.

Each of the dedicated communication channel 128 and the data peering channel may implement communication using different communication protocols. Examples of such communication protocols include, but are not limited to, File Transfer Protocol (FTP), Transmission Control Protocol/Internet Protocol (TCP/IP), User Datagram Protocol (UDP), Hypertext Transfer Protocol (HTTP), and Internet Message Access Protocol (IMAP).

In an example, the dedicated communication channel 128 and the data peering channel may form a direct communication link between the source database server 102 and the destination database server 126. In another example, the dedicated communication channel 128 and the data peering channel may be formed over the network 124 for communication between the source database server 102 and the destination database server 126.

In one example, upon receiving the OOSD notification over the dedicated communication channel 128, the destination database server 126 may ascertain that the data notification is an out-of-sequence data notification and the data is out-of-sequence data. The destination database server 126 may analyze the out-of-sequence data notification to obtain the out-of-sequence data, a tag associated with the out-of-sequence data, and the timestamp associated with the out-of-sequence data. In one example, the tag may identify the data source from which the out-of-sequence data originated. The destination database server 126 may accordingly incorporate the out-of-sequence data within pre-stored data associated with the tag, in a time-sequential manner based on the timestamp.

Figure 2A:
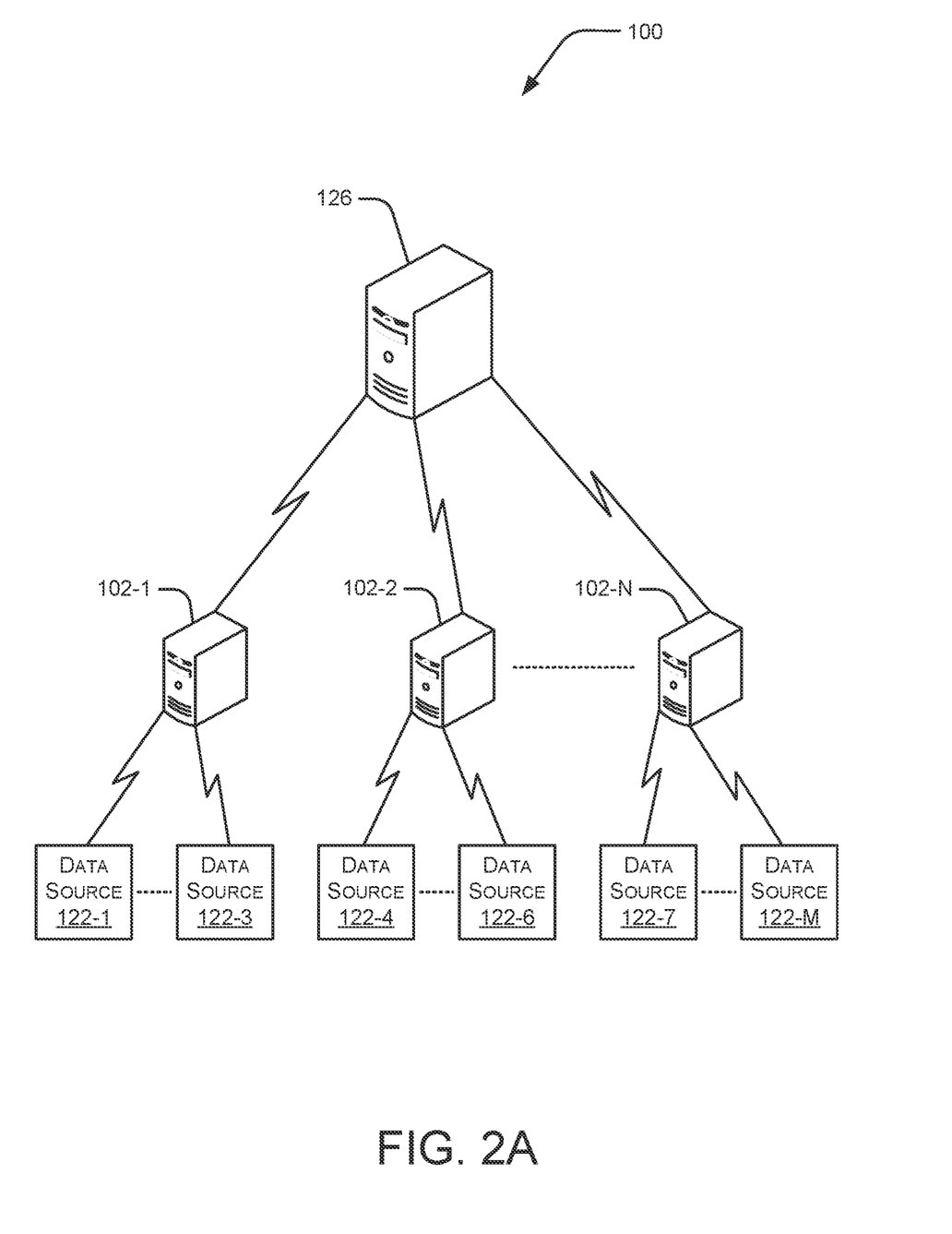
FIG. 2A illustrates the data management system, according to another example.

FIG. 2A illustrates the data management system 100, according to another example. As illustrated, in an example, each of one or more source database servers 102-1 to 102-N may be communicably coupled with at least one data source from among data sources 122-1 to 122-M. The one or more source database servers 102-1 to 102-N may be collectively referred to as source database servers 102 and individually as source database server 102. The data sources 122-1 to 122-M may be collectively referred to as data sources 122 and individually as data source 122. Here, both N and M can be equal to or greater than 1. For example, the source database server 102-1 maybe communicably coupled with data sources 122-1 to 122-3, the source database server 102-2 maybe communicably coupled with data sources 122-3 to 122-6, and the source database server 102-N maybe communicably coupled with data sources 122-7 to 122-M. Although three data sources have been illustrated as being communicably coupled to the source database servers 102, for the sake of brevity, it should be understood to a person skilled in the art that the number of the data sources communicably coupled to each of the source database servers 102 can be equal to or greater than 1. As illustrated, the one or more source database servers 102 may further be communicably coupled with the destination database server 126.

Figure 2B:
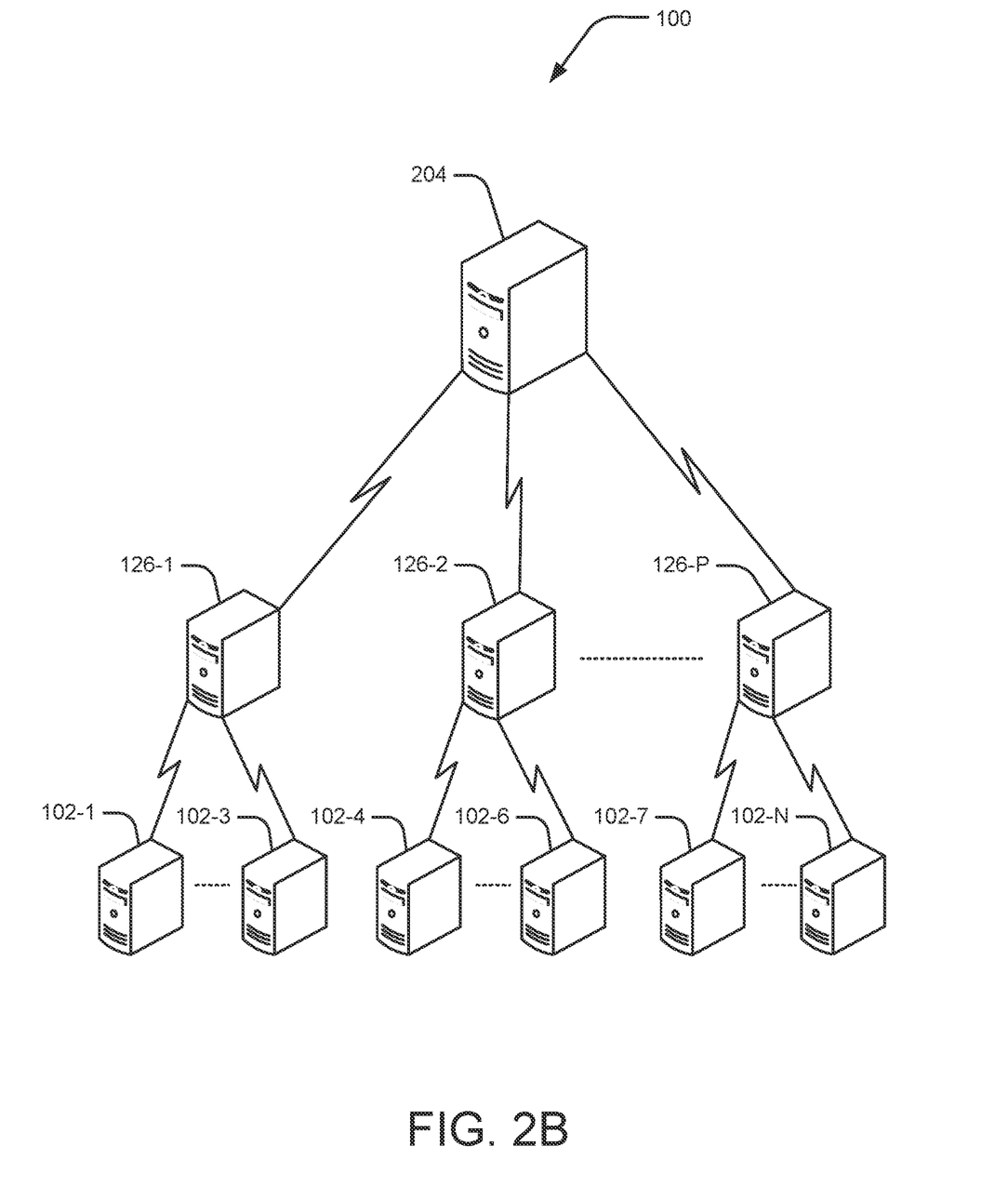
FIG. 2B illustrates the data management system, according to another example.

FIG. 2B illustrates the data management system 100, according to yet another example. As illustrated, in an example, each of one or more destination database servers 126-1 to 126-P may be communicably coupled with the one or more source database servers 102-1 to 122-N. The one or more destination database servers 126-1 to 126-P may be collectively referred to as destination database servers 126 and individually as destination database server 126. Here, P is an integer equal to or greater than 1. For example, the destination database server 126-1 maybe communicably coupled with source database servers 102-1 to 102-3, the destination database server 126-2 maybe communicably coupled with source database servers 102-4 to 102-6, and the destination database server 126-P maybe communicably coupled with source database servers 102-7 to 102-N. Although three source database servers 102 have been illustrated as being communicably coupled to the destination database servers 126 for the sake of brevity, it should be understood to a person skilled in the art that the number of the source database servers communicably coupled to each of the destination database servers 126 can be equal to or greater than 1.

As illustrated, the destination database servers 126 may be communicably coupled with a global database server 204. In one example, the global database server 204 may be hosted virtually, for example, on a cloud-based platform at the site or away from the site. In another example, the global database server 204 may be a stand-alone physical system geographically located either on the site or away from the site. In an example, the global database server 204, the destination database servers 126, and the source database servers 102 may be geographically located at same or different locations.

In the example illustrated in FIG. 2B, the functionalities described with respect to the source database servers 102, in the remaining Figures, may be performed by the destination database servers 126. Further, the functionalities described with respect to the destination database server 126, in the remaining Figures, may be performed by the global database server 204. Further, the source database servers 102, either alone or in combination with the at least one data source 122 may act as a source of data for the destination database servers 126.

Figure 3:
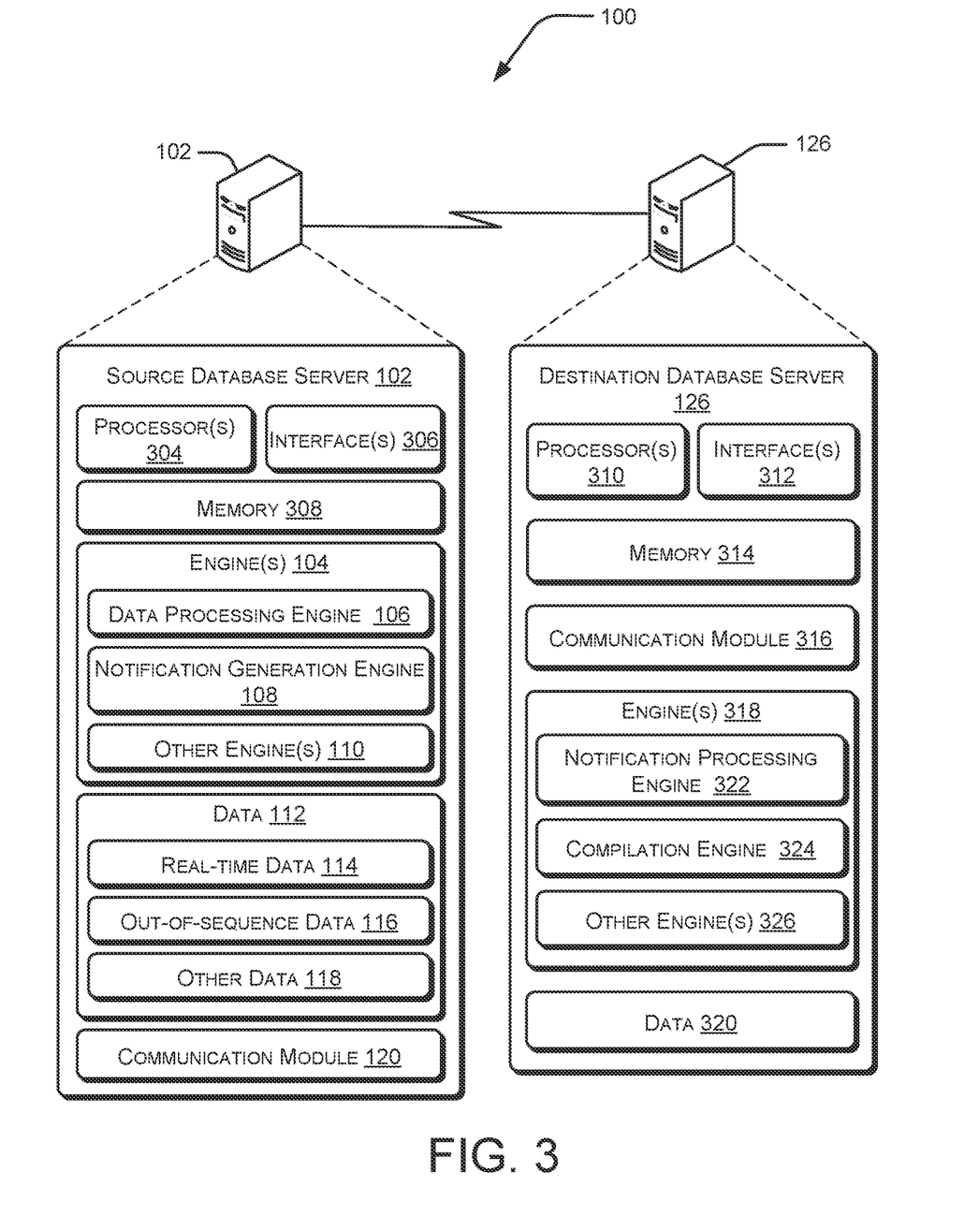
FIG. 3 illustrates a block diagram of a data management system, according to yet another example.

FIG. 3 illustrates a block diagram of the data management system 100, according to yet another example. The data management system 100 includes the source database server 102 and the destination database server 126 communicably coupled with each other. The source database server 102 includes processor(s) 304, interface(s) 306, memory 308, the engine(s) 104, the data 112, and the communication module 120. The destination database server 126 may include processor(s) 310, interface(s) 312, memory 314, a communication module 316, engine(s) 318, and data 320. The source database server 102 and the destination database server 126 may include components, other than the depicted components, such as display, input/output interfaces, operating systems, applications, and other software or hardware components (all of which have not been depicted).

Each of the processor(s) 304 and 310 may be implemented as microprocessors, microcomputers, microcontrollers, digital signal processors, central processing units, state machines, logic circuitries, and/or other devices that manipulate signals based on operational instructions. The interface(s) 306 and 312 may allow the connection or coupling of the source database server 102 and the destination database server 126, respectively, with one or more other devices (say the data sources 122 or with each other), through a wired (e.g., Local Area Network, i.e., LAN) connection or through a wireless connection (e.g., Bluetooth®, Wi-Fi). The interface(s) 306 may also enable intercommunication between different logical as well as hardware components of the source database server 102.

The memory 308 and 314 may be a computer-readable medium, examples of which include volatile memory (e.g., RAM), and/or non-volatile memory (e.g., Erasable Programmable read-only memory, i.e., EPROM, flash memory, etc.). The memory 308 and 314 may be an external memory, or internal memory, such as a flash drive, a compact disk drive, an external hard disk drive, or the like. The memory 308 and 314 may further include data 112 and data 320, respectively, and/or other data which either may be received, utilized, or generated during the operation of the source database server 102 and/or the destination database server 126.

The communication module 316 may be a wireless communication module. Examples of the communication module 316 may include, but are not limited to, Global System for Mobile communication (GSM) modules, Code-division multiple access (CDMA) modules, Bluetooth modules, network interface cards (NIC), Wi-Fi modules, dial-up modules, Integrated Services Digital Network (ISDN) modules, Digital Subscriber Line (DSL) modules, and cable modules. In one example, the communication module 316 may also include one or more antennas to enable wireless transmission and reception of data and signals. The communication module 316 may herein be alternatively referred to as a second communication module 316.

The engine(s) 318 may be implemented as a combination of hardware and programming, for example, programmable instructions to implement a variety of functionalities of the engine(s) 318. In examples described herein, such combinations of hardware and programming may be implemented in several different ways. For example, the programming for the engine(s) 318 may be executable instructions. Such instructions may be stored on a non-transitory machine-readable storage medium which may be coupled either directly with the destination database server 126 or indirectly (for example, through networked means). In an example, the engine(s) 318 may include a processing resource, for example, either a single processor or a combination of multiple processors, to execute such instructions. In the present examples, the non-transitory machine-readable storage medium may store instructions that, when executed by the processing resource, implement engine(s) 318. In other examples, the engine(s) 318 may be implemented as electronic circuitry.

In one example, the engine(s) 318 may include a notification processing engine 322, a compilation engine 324, and other engine(s) 326. The other engine(s) 326 may further implement functionalities that supplement functions performed by the destination database server 126 or any of the engine(s) 318.

The data 320 includes data that is either received, stored, or generated as a result of functions implemented by any of the engine(s) 318 or the destination database server 126. It may be further noted that information stored and available in the data 320 may be utilized by the engine(s) 318 for performing various functions by the destination database server 126.

In operation, the communication module 316 of the destination database server 126 may transmit a notification request signal to the source database server 102. The notification request signal may be a request to establish the dedicated communication channel 128 between the source database server 102 and the destination database server 126 for receiving out-of-sequence data (OOSD) notifications having the out-of-sequence data 116.

In one example, the communication module 120 of the source database server 102 may receive the notification request signal from the communication module 316 of the destination database server 126. In response to receiving the notification request signal, the communication module 120 may establish the dedicated communication channel 128 between the source database server 102 and the destination database server 126.

As the data sources 122 and the source database server 102 start operating, the communication module 120 of the source database server 102 may start receiving time-stamped data from at least one data source 122. The time-stamped data has a timestamp associated therewith. When the timestamp is of a time prior to the current time, the time-stamped data may be out-of-sequence data 116. However, if the timestamp is same as the current time, the time-stamped data may be a real-time data 114. The communication module 120 may comprise a first type of application programming interface (API) (not illustrated) and a second type of API (not illustrated). The first type of API and the second type of API may be a part of interface(s) 306. In one example, the first type of API may receive the out-of-sequence data 116 from the at least one data source 122, while the second type of API may receive real-time data 114 from the at least one data source 122. Examples of the first type of API include, but are not limited to, an open platform communications (OPC) server interface, an OPC unified architecture (UA) server interface, a remote API server interface, and an API server interface. Examples of the second type of API include, but are not limited to, a real-time data server interface communicatively coupled to a supervisory control and data acquisition (SCADA) system or a distributed control system (DCS) through a real-time data interface (RDI) communication link.

Upon receiving the time-stamped data, the data processing engine 106 may tag the time-stamped data with a tag. In an example, the tag may be a unique identifier indicative of the data source 122 from which the time-stamped data originated. In an example, the tag may be a part of the other data 118. For example, the data processing engine 106 may tag all the time-stamped data received from a first data source, say the data source 122-1 corresponding to a laboratory, with a specific tag, say tag 1. Similarly, the data processing engine 106 may tag all the time-stamped data received from a second data source, say the data source 122-2 which may be a thermostat, with a specific tag, say tag 2. The data processing engine 106 may store the time-stamped data originating from the same data source at the same location based on the tag. In other words, based on the tag associated therewith, the time-stamped data may be separately arranged for separate tags. Thus, in the above example, all the time-stamped data tagged with tag 1 may be stored separately and sequentially at a first location and all the time-stamped data tagged with tag 2 may be stored separately and sequentially at a second location.

The data processing engine 106 may then identify the out-of-sequence data 116 from amongst the time-stamped data received from the at least one data source 122. The data processing engine 106 may further ascertain the type of API from which the time-stamped data has been received to determine if the time-stamped data is the real-time data 114 or the out-of-sequence data 116. In an example, the data processing engine 106 may identify the time-stamped data to be the out-of-sequence data 116 based on a determination that the time-stamped data is received through the first type of API. Further, the data processing engine 106 may identify the time-stamped data to be the real-time data 114 based on a determination that the time-stamped data is received through the second type of API.

Upon identifying the time-stamped data to be the real-time data 114, the notification generation engine 108 may generate a data notification, such as a real-time data notification, indicating receipt of the real-time data 114 from the at least one data source 122. The real-time data notification includes the real-time data 114. In an example, the real-time data 114 included in the real-time data notification may have the tag indicative of the at least one data source 122 from which the real-time data 114 originated.

Upon determining the time-stamped data to be the out-of-sequence data 116, the notification generation engine 108 may generate a data notification, such as an OOSD notification, indicating receipt of the out-of-sequence data 116 from the at least one data source 122. The OOSD notification includes the out-of-sequence data 116. In an example, the OOSD notification may be generated every time the out-of-sequence data 116 is received by the source database server 102. In an example, the out-of-sequence data 116 included in the OOSD notification may have the tag indicative of the at least one data source 122 from which the out-of-sequence data 116 originated.

The communication module 120 of the source database server 102 may transmit the data notification, such as the real-time data notification or the OOSD notification, to the destination database server 126. In one example, the communication module 120 may transmit the OOSD notification over the dedicated communication channel 128. The communication module 120 of the source database server 102 may transmit the real-time data notification to the destination database server 126 over the data peering channel different from the dedicated communication channel 128.

The communication module 316 of the destination database server 126 may receive the data notification from the source database server 102. The data notification may be one of the OOSD notification including the out-of-sequence data or the real-time data notification including the real-time data.

Upon receiving the data notification, based on identification of a communication channel over which the data notification has been received, the notification processing engine 322 may determine whether the data notification is the OOSD notification or the real-time data notification. In one example, upon identifying that the communication channel over which the data notification is received is the dedicated communication channel 128, the notification processing engine 322 may determine the data notification to be the OOSD notification. In another example, upon identifying that the communication channel over which the data notification is received is the data peering channel, the notification processing engine 322 may determine the data notification to be the real-time data notification.

Upon determining that the data notification is the OOSD notification, the notification processing engine 322 of the destination database server 126 may retrieve the out-of-sequence data from the OOSD notification. The notification processing engine 322 may further analyze the out-of-sequence data to identify the tag associated with the out-of-sequence data.

The compilation engine 324 of the destination database server 126 may incorporate, in a database (not illustrated) or the memory 314 of the destination database server 126, the out-of-sequence data, within pre-stored data associated with the tag, in a time-sequential manner based on the timestamp. For example, if tag 1 is identified to be associated with the out-of-sequence data, the compilation engine 324 may incorporate the out-of-sequence data, in a time-sequential manner, within the pre-stored data associated with the data source 122-1 corresponding to the laboratory. In this manner, all the time-stamped data tagged with tag 1 may be stored separately and sequentially at a first location in the database or the memory 314 of the destination database server 126. The database may either be an integral part of the destination database server 126 or the database may be coupled to the destination database server 126 through a wired or a wireless communication link.

Upon determining that the data notification is the real-time data notification, the notification processing engine 322 may retrieve the real-time data from the real-time data notification. The notification processing engine 322 may further analyze the real-time data to identify the tag associated with the real-time data. The compilation engine 324 may then sequentially incorporate, in the database or the memory 314 of the destination database server 126, the real-time data, within pre-stored data associated with the tag. For example, if tag 2 is identified to be associated with the real-time data, the compilation engine 324 may incorporate the real-time data sequentially with the pre-stored data associated with the data source 122-2 which may be the thermostat. In this manner, all the real-time data tagged with tag 2 may be stored separately and sequentially at a second location in the database or the memory 314 of the destination database server 126.

The destination database server 126 may thus receive the out-of-sequence data each time the out-of-sequence is received by the source database server 102. Thus, data loss is prevented and it is ensured that all the out-of-sequence data received at the source database server 102 is automatically and timely transmitted to the destination database server 126 without the destination database server 126 implementing additional processing resources for querying and auditing a set of data which may include real-time data 114 in addition to the out-of-sequence data.

Figure 4:
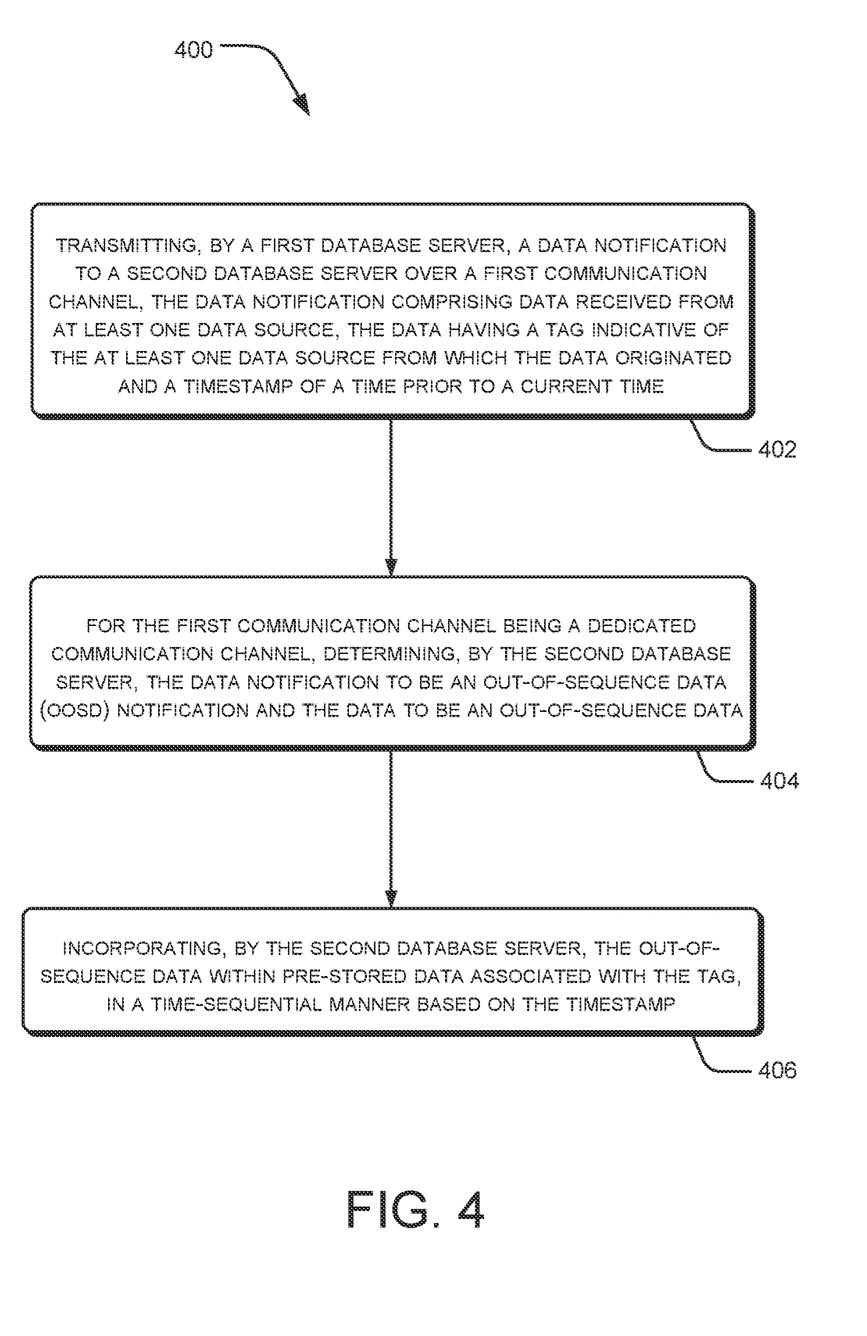
FIG. 4 illustrates a method for managing communication between a first database server and a second database server of a data management system, according to an example.

FIG. 4 illustrates a method 400 for managing communication between a first database server and a second database server of a data management system, as per an example. In an example, the first database server may be the source database server 102, and the second database server may be the destination database server 126. In another example, the first database server may be the destination database server 126, and the second database server may be the global database server 204. The order in which the above-mentioned method 400 is described is not intended to be construed as a limitation, and some of the described method blocks may be combined in a different order to implement the method 400, or an alternative method.

Furthermore, the above-mentioned method 400 may be implemented in a suitable hardware, computer-readable instructions, or combination thereof. The steps of such method 400 may be performed by either a system under the instruction of machine executable instructions stored on a non-transitory computer-readable medium or by dedicated hardware circuits, microcontrollers, or logic circuits. For example, the method 400 may be performed by components of a data management system, such as the source database server 102 of the data management system 100, the destination database server 126 of the data management system 100 or the global database server 204 of the data management system 100. In an implementation, the method may be performed under an "as a service" delivery model, where the data management system 100 operated by a provider, receives programmable code. Herein, some examples are also intended to cover non-transitory computer-readable medium, for example, digital data storage media, which are computer-readable and encode computer-executable instructions, where said instructions perform some or all the steps of the above-mentioned method 400.

In an example, according to the method 400, at block 402, a data notification is transmitted, by the first database server, to the second database server over a first communication channel. The data notification comprises data received from at least one data source 122. The data has a tag indicative of the at least one data source 122 from which the data originated and a timestamp of a time prior to a current time. The current time may be defined as a time of receiving the data at the first database server from the at least one data source 122. In an example, the first communication channel may be one of the dedicated communication channel 128 and the data peering channel.

At block 404, it is determined if the data notification is an out-of-sequence data (OOSD) notification. In one example, upon receiving the data notification, the second database server may ascertain if the first communication channel is a dedicated communication channel, say the dedicated communication channel 128. On ascertaining the first communication channel to be the dedicated communication channel, the data notification is determined to be an out-of-sequence data (OOSD) notification. Further, the data is determined to be out-of-sequence data.

At block 406, the out-of-sequence data is incorporated, by the second database server, within pre-stored data. In one example, upon determining the data notification to be an OOSD notification, the second database server may analyze the OOSD notification to identify the associated OOSD notification. Based on the tag, the pre-stored data associated with the tag may then be identified. The out-of-sequence data may then be stored in the pre-stored data associated with the tag in a time-sequential manner based on the timestamp.

Figure 5A:
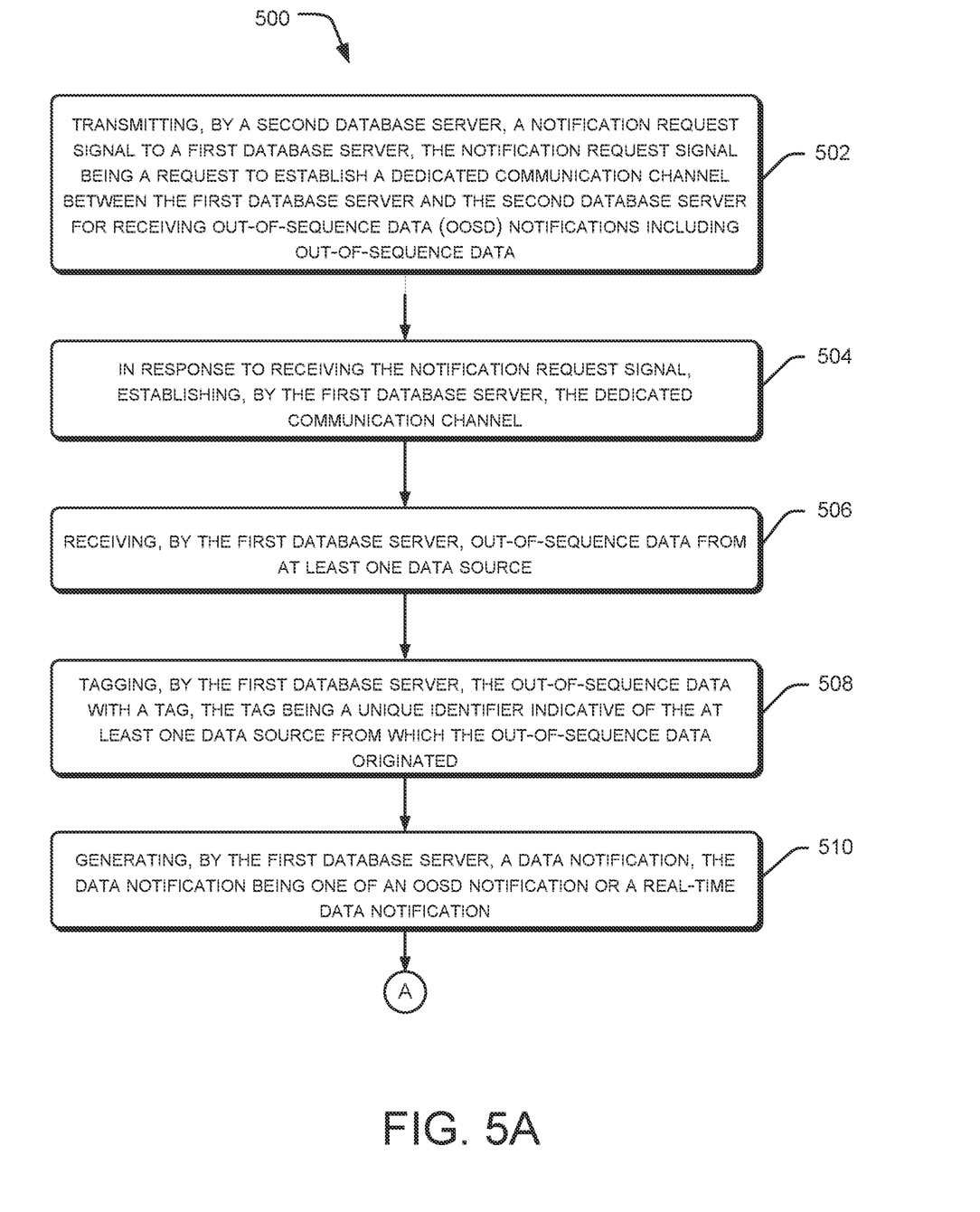
FIG. 5A and FIG. 5B illustrate a method for managing communication between a first database server and a second database server of a data management system, according to an example.
Figure 5B:
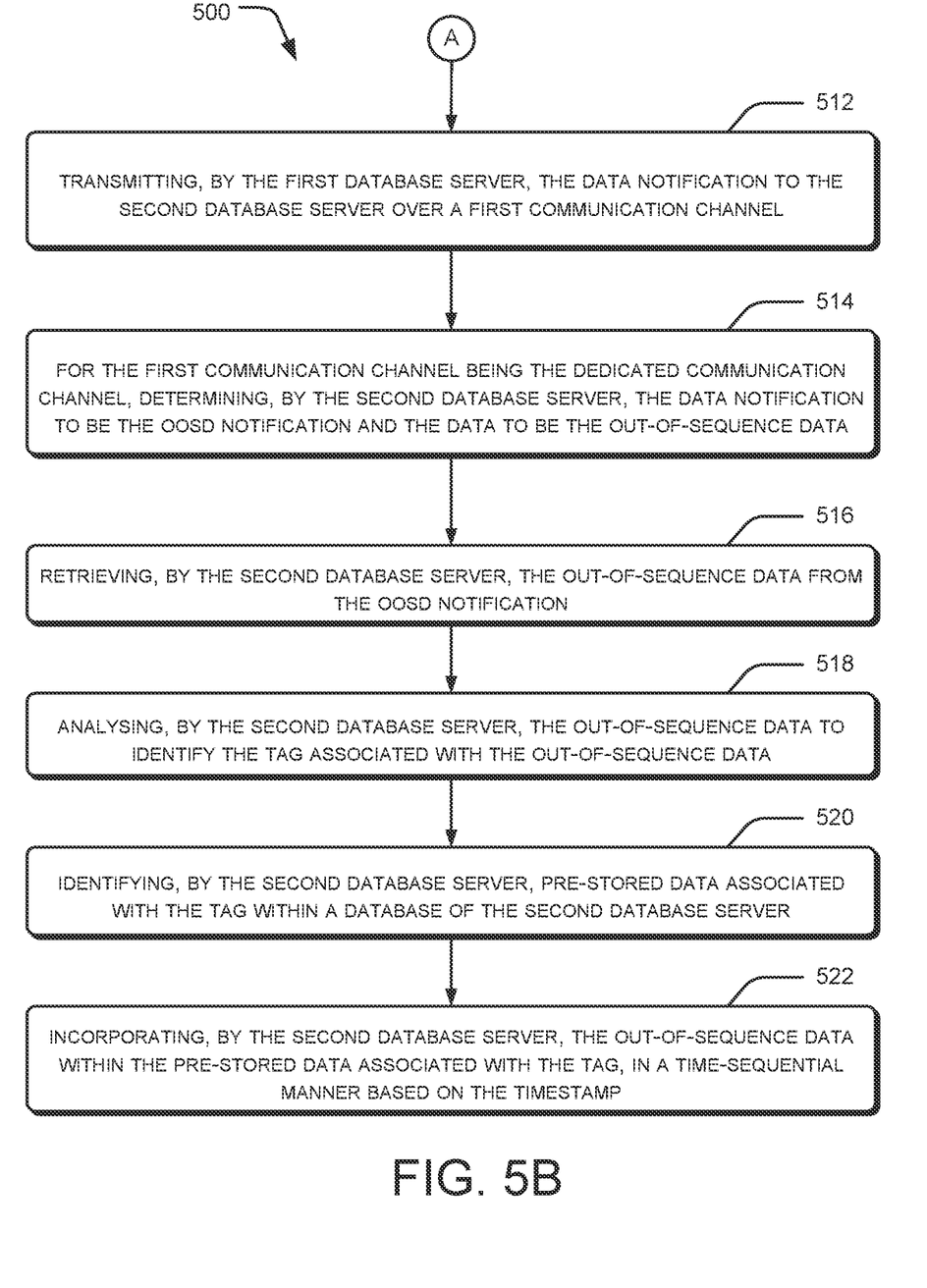

FIG. 5A and FIG. 5B illustrate a method 500 for managing communication between a first database server and a second database server of a data management system, as per another example. In an example, the first database server may be the source database server 102, while the second database server may be the destination database server 126. In another example, the first database server may be the destination database server 126, and the second database server may be the global database server 204. The order in which the above-mentioned method 500 is described is not intended to be construed as a limitation, and some of the described method blocks may be combined in a different order to implement the method 500, or an alternative method.

Furthermore, the above-mentioned method may be implemented in a suitable hardware, computer-readable instructions, or combination thereof. The steps of such method may be performed by either a system under the instruction of machine executable instructions stored on a non-transitory computer-readable medium or by dedicated hardware circuits, microcontrollers, or logic circuits. For example, the method may be performed by components of a data management system, such as the source database server 102 of the data management system 100, the destination database server 126 of the data management system 100, or the global database server 204 of the data management system 100. In an implementation, the method may be performed under an "as a service" delivery model, where the data management system 100, operated by a provider, receives programmable code. Herein, some examples are also intended to cover non-transitory computer-readable medium, for example, digital data storage media, which are computer-readable and encode computer-executable instructions, where said instructions perform some or all the steps of the above-mentioned methods.

In an example, at block 502, a notification request signal may be transmitted, by the second database server, to the first database server. The notification request signal may be a request to establish a dedicated communication channel, say, the dedicated communication channel 128 between the first database server and the second database server for receiving OOSD notifications including out-of-sequence data.

At block 504, in response to receiving the notification request signal, the dedicated communication channel may be established by the first database server. In one example, the dedicated communication channel may be a secure private communication channel to allow communication between the second database server and the first database server without requiring the second database server and the first database server to by-pass any firewall.

At block 506, out-of-sequence data may be received, by the first database server, from at least one data source, say, the data source 122-1. The out-of-sequence data may have a timestamp of a time prior to a current time. The current time may be defined as a time of receiving the data at the first database server from the at least one data source. The out-of-sequence data may be received from the at least one data source based on one of an input from a user, test results of a laboratory, a data modification input from a user, and calculation results by a calculating unit coupled to the at least one data source. For example, a user may provide an input for modifying the data already stored in the first database server with a timestamp prior to the current time. Further, data related to test results from a laboratory may be received at the first database server after the timestamp associated with the data related to the test results.

At block 508, the out-of-sequence data may be tagged, by the first database server, with an identification tag. In an example, the tag may be a unique identifier indicative of the data source from which the out-of-sequence data originated. Each data source may be associated with a unique tag and data generated by the particular data source may be tagged with the same unique tag. The tag may be used to differentiate the data generated by different data sources and may facilitate in easy storage, search, and retrieval of the data generated by a particular data source.

At block 510, a data notification may be generated by the first database server. The data notification may be one of an OOSD notification or a real-time data notification. In one example, upon receiving the out-of-sequence data, the first database server may determine that the second database server needs to be notified about the reception of the out-of-sequence data, to prevent any data loss. The first database server may then generate the OOSD notification including the tagged out-of-sequence data. In an example, the OOSD notification may be generated every time the out-of-sequence data is received by the first database server. In an example, upon receiving real-time data from at least one data source, say the data source 122-2, the first database server may generate the real-time data notification including the real-time data.

At block 512, the data notification is transmitted, by the first database server, to the second database server over a first communication channel. In one example, the data notification maybe the OOSD notification. The data notification may comprise the data, the tag indicative of the at least one data source from which the data originated, and a timestamp of a time prior to a current time. The current time may be defined as a time of receiving the data at the first database server from the at least one data source. In one example, the first communication channel may be either a dedicated communication channel, such as the dedicated communication channel 128, or a data peering channel, such as the data peering channel. The dedicated communication channel may be one of an open platform communications (OPC) server API, an OPC unified architecture (UA) server API, a remote API server interface, and an API server interface.

At block 514, it is determined if the data notification is the OOSD notification or another notification, such as the real-time data notification. Upon receiving the data notification it is ascertained, by the second database server, whether the first communication channel is the dedicated communication channel or the data peering channel. If it is determined that the first communication channel is the dedicated communication channel, the data notification is determined to be the OOSD notification and the data is determined to be the out-of-sequence data.

At block 516, the out-of-sequence data is retrieved, by the second database server, from the OOSD notification.

At block 518, the out-of-sequence data is analysed, by the second database server, to identify the tag associated with the out-of-sequence data.

At block 520, pre-stored data associated with the tag is identified, by the second database server, within a database of the second database server. The database may either be an integral part of the second database server or the database may be coupled to the second database server through a wired or a wireless communication link.

At block 522, the out-of-sequence data is incorporated, by the second database server, within the pre-stored data associated with the tag, in a time-sequential manner based on the timestamp. Thus, the out-of-sequence data originating from the same data source may be incorporated at the same location. In other words, based on the tag associated therewith, the out-of-sequence data may be separately arranged for separate tags in a time-sequential manner along with the real-time data.

Through the above-mentioned method, data loss is prevented and it is ensured that all the out-of-sequence data received at the first database server is automatically and timely transmitted to the second database server without the second database server implementing additional processing resources for querying and auditing a set of data which may include real-time data in addition to the out-of-sequence data.

Figure 6:
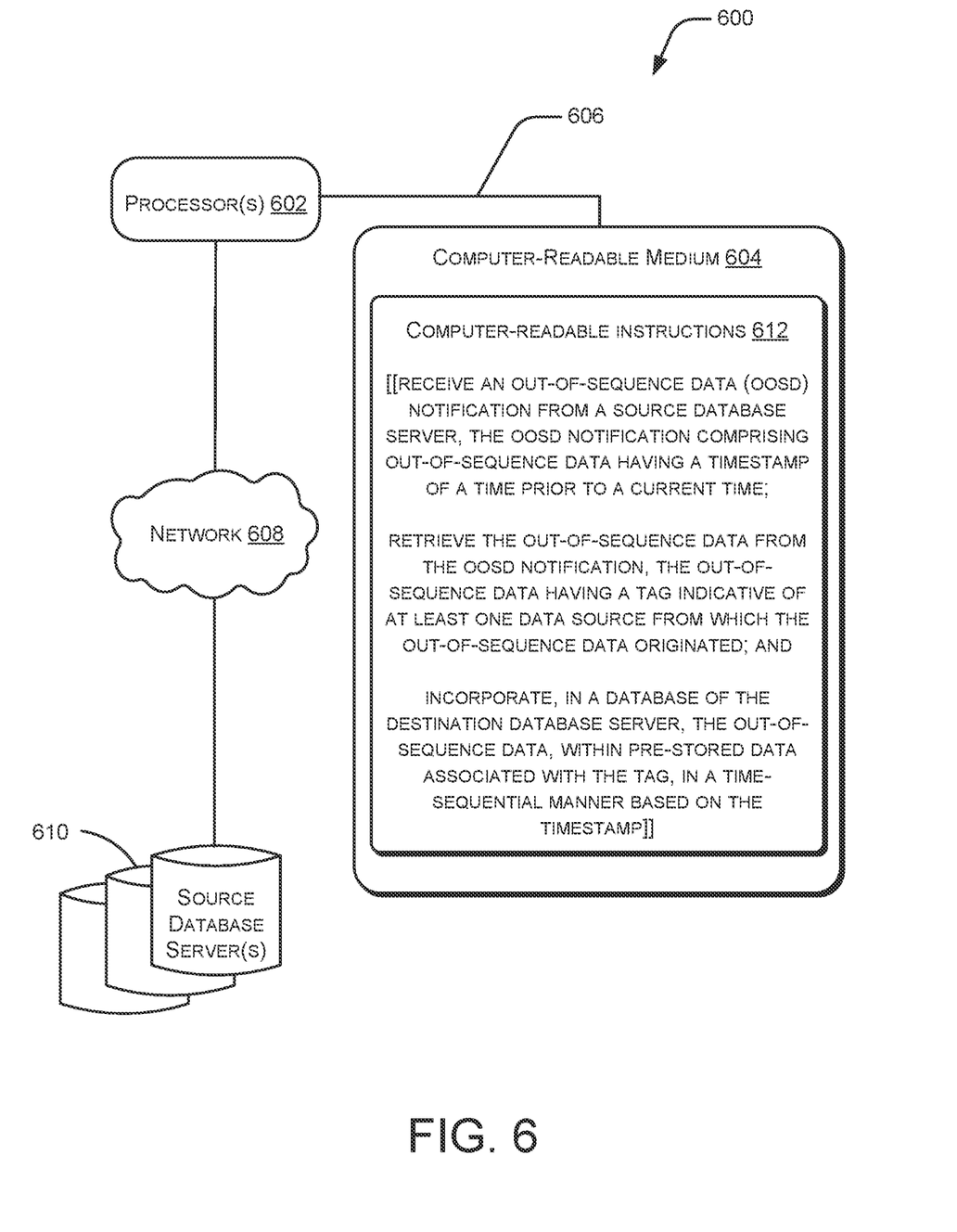
FIG. 6 illustrates a system environment implementing a non-transitory computer-readable medium for managing communication between a source database server and a destination database server of a data management system, according to an example.

FIG. 6 illustrates a system environment 600 implementing a non-transitory computer-readable medium for managing communication between a source database server and a destination database server of a data management system, according to an example. In an example, the system environment 600 includes processor(s) 602 communicatively coupled to a non-transitory computer-readable medium 604 through a communication link 606. In an example implementation, the system environment 600 may be for example, the data management system 100. In an example, the processor(s) 602 may have one or more processing resources for fetching and executing computer-readable instructions from the non-transitory computer-readable medium 604. The processor(s) 602 and the non-transitory computer-readable medium 604 may be implemented, for example, in the destination database server 126 or the global database server 204 (as has been described in conjunction with the preceding figures).

The non-transitory computer-readable medium 604 may be, for example, an internal memory device or an external memory device. In an example implementation, the communication link 606 may be a network communication link. The processor(s) 602 and the non-transitory computer-readable medium 604 may also be communicatively coupled to at least one source database server 610 over a network 608. The network 608 may be similar to the network 124.

In an example implementation, the non-transitory computer-readable medium 604 may include a set of computer-readable instructions 612 which may be accessed by the processor(s) 602 through the communication link 606. Referring to FIG. 6, in an example, the non-transitory computer-readable medium 604 may include computer-readable instructions 612, hereinafter may also be referred as instructions, that may cause the processor(s) 602 to receive an out-of-sequence data (OOSD) notification from a source database server 102, 610. The OOSD notification comprises out-of-sequence data having a timestamp of a time prior to a current time. The current time may be defined as a time of receiving the data at the source database server 102, 610 from at least one data source 122.

The OOSD notification may be received over a dedicated communication channel 128 different from a data transfer channel. In an example, the dedicated communication channel may be one of an open platform communications (OPC) server API, an OPC unified architecture (UA) server API, a remote API server interface, and an API server interface. In one example, the data transfer channel may be utilized for receiving, at the destination database server 126, real-time data 114 having a timestamp of the current time, from the source database server 102. The out-of-sequence data may be received from the at least one data source 122 based on one of an input from a user, test results of a laboratory, a data modification input from a user, and calculation results by a calculating unit coupled to the at least one data source 122.

The instructions 612 may cause the processor(s) 602 to retrieve the out-of-sequence data from the OOSD notification. The out-of-sequence data has a tag indicative of at least one data source 122 from which the out-of-sequence data originated.

The instructions 612 may further cause the processor(s) 602 to incorporate, in a database of the destination database server 126, the out-of-sequence data, within pre-stored data associated with the tag, in a time-sequential manner based on the timestamp. The database may either be an integral part of the destination database server 126 or the database may be coupled to the destination database server 126 through a wired or a wireless communication link.

In one example, to incorporate the out-of-sequence data within the pre-stored data associated with the tag, the instructions 612 may further cause the processor(s) 602 to analyze the out-of-sequence data to identify the tag associated with the out-of-sequence data. Further, the instructions 612 cause the processor(s) 602 to identify, within the database, the pre-stored data associated with the tag.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A data management system comprising:
a source database server comprising:

a data processing engine to identify out-of-sequence data from amongst time-stamped data received from at least one data source connected to a dedicated communication channel, the out-of-sequence data having a timestamp of a time prior to a current time, wherein the out-of-sequence data is identified based on a tag associated with the out-of-sequence data, and wherein the tag is indicative of the at least one data source from which the out-of-sequence data originated;

a notification generation engine to generate an out-of-sequence data (OOSD) notification indicating receipt of the out-of-sequence data from the at least one data source, the OOSD notification including the out-of-sequence data; and a first communication module to transmit the OOSD notification to a destination database server over the dedicated communication channel.

2. The data management system of claim 1, wherein the first communication module comprises:

a first type of application programming interface (API) to receive the out-of-sequence data from the at least one data source; and a second type of API to receive real-time data from the at least one data source, the real-time data having a timestamp of the current time.

3. The data management system of claim 2, wherein the first type of API is one of an open platform communications (OPC) server interface, an OPC unified architecture (UA) server interface, a remote API server interface, and an API server interface; and wherein the second type of API is a real-time data server interface communicatively coupled to a supervisory control and data acquisition (SCADA) system or a distributed control system (DCS) through a real-time data interface (RDI) communication link.

4. The data management system of claim 2, wherein the data processing engine is to:

identify the time-stamped data to be the out-of-sequence data based on a determination that the time-stamped data is received through the first type of API; and identify the time-stamped data to be the real-time data based on a determination that the time-stamped data is received through the second type of API.

5. The data management system of claim 2, wherein the first communication module is to:

transmit the real-time data to the destination database server over a data peering communication channel different from the dedicated communication channel.

6. The data management system of claim 1, wherein the data management system comprises:

a destination database server comprising:

a second communication module to receive the OOSD notification including the out-of-sequence data from the source database server;

a notification processing engine to:

retrieve the out-of-sequence data from the OOSD notification; and analyze the out-of-sequence data to identify the tag associated with the out-of-sequence data; and a compilation engine to incorporate, in a database of the destination database server, the out-of-sequence data, within pre-stored data associated with the tag, in a time-sequential manner based on the timestamp.

7. The data management system of claim 1, wherein the data management system comprises:

a destination database server comprising:

a second communication module to transmit a notification request signal to the source database server, the notification request signal being a request to establish the dedicated communication channel between the source database server and the destination database server for receiving OOSD notifications including out-of-sequence data.

8. The data management system of claim 7, wherein the first communication module is to:

receive the notification request signal from the destination database server; and in response to receiving the notification request signal, establishing the dedicated communication channel.

9. The data management system of claim 1, wherein the out-of-sequence data is received from the at least one data source based on one of:

an input from a user;

test results of a laboratory; a data modification input from a user; and calculation results by a calculating unit coupled to the at least one data source.

10. A method comprising:

transmitting, by a first database server, a data notification to a second database server over a first communication channel, the data notification comprising data received from at least one data source, the data having a tag indicative of the at least one data source from which the data originated and a timestamp of a time prior to a current time;

for the first communication channel being a dedicated communication channel, determining, by the second database server, the data notification to be an out-of-sequence data (OOSD) notification and the data to be out-of-sequence data;

retrieving, by the second database server, the out-of-sequence data from the OOSD notification;

analyzing, by the second database server, the out-of-sequence data to identify the tag associated with the out-of-sequence data; and incorporating, by the second database server, the out-of-sequence data within pre-stored data associated with the tag, in a time-sequential manner based on the timestamp.

11. The method of claim 10, wherein the method comprises:

transmitting, by the second database server, a notification request signal to the first database server, the notification request signal being a request to establish the dedicated communication channel between the first database server and the second database server for receiving OOSD notifications including out-of-sequence data; and in response to receiving the notification request signal, establishing, by the first database server, the dedicated communication channel.

12. The method of claim 10, wherein incorporating the out-of-sequence data within the pre-stored data associated with the tag comprises:

identifying, by the second database server, the pre-stored data associated with the tag within a database of the second database server.

13. The method of claim 10, wherein the out-of-sequence data is received from the at least one data source based on one of:

an input from a user;

test results of a laboratory;

a data modification input from a user; and calculation results by a calculating unit coupled to the at least one data source.

14. The method of claim 10, wherein the dedicated communication channel is one of an open platform communications (OPC) server API, an OPC unified architecture (UA) server API, a remote API server interface, and an API server interface.

15. The method of claim 10, wherein the method comprises:
   receiving, by the first database server, the out-of-sequence data from the at least one data source;
   tagging, by the first database server, the out-of-sequence data with the tag, the tag being a unique identifier indicative of the at least one data source from which the data originated; and
   generating, by the first database server, the OOSD notification including the tagged out-of-sequence data.

16. A non-transitory computer-readable medium comprising instructions for managing communication between a source database server and a destination database server, the instructions being executable by a processing resource to:
   receive an out-of-sequence data (OOSD) notification from a source database server, the OOSD notification comprising out-of-sequence data having a timestamp of a time prior to a current time;
   retrieve the out-of-sequence data from the OOSD notification, the out-of-sequence data having a tag indicative of at least one data source from which the out-of-sequence data originated;
   analyze the out-of-sequence data to identify the tag associated with the out-of-sequence data; and
   incorporate, in a database of the destination database server, the out-of-sequence data, within pre-stored data associated with the tag, in a time-sequential manner based on the timestamp.

17. The non-transitory computer-readable medium of claim 16, wherein to incorporate the out-of-sequence data within the pre-stored data associated with the tag, the instructions are executable by the processing resource to:
   identify, within the database, the pre-stored data associated with the tag.

18. The non-transitory computer-readable medium of claim 16, wherein the out-of-sequence data is received from the at least one data source based on one of:
   an input from a user;
   test results of a laboratory;
   a data modification input from a user; and
   calculation results by a calculating unit coupled to the at least one data source.

19. The non-transitory computer-readable medium of claim 16, wherein the OOSD notification is received over a dedicated communication channel different from a data transfer channel, wherein the data transfer channel is to receive, at the destination database server from the source database server, real-time data having a timestamp of the current time.

20. The non-transitory computer-readable medium of claim 19, wherein the dedicated communication channel is one of an open platform communications (OPC) server API, an OPC unified architecture (UA) server API, a remote API server interface, and an API server interface.

* * * * *